US005083498A

United States Patent [19]

Sato et al.

[11] Patent Number: 5,083,498

[45] Date of Patent: Jan. 28, 1992

[54] BENDABLE ACTUATOR

[75] Inventors: Teruyoshi Sato, Kawasaki; Koichi Negishi, Kodaira, both of Japan

[73] Assignee: Bridgestone Corporation, Tokyo, Japan

[21] Appl. No.: 587,885

[22] Filed: Sep. 25, 1990

[30] Foreign Application Priority Data

Sep. 25, 1989 [JP] Japan .................................. 1-246571

[51] Int. Cl.[5] .......................... F01B 19/00; F16J 3/00

[52] U.S. Cl. .................................... 92/92; 92/117 R; 92/89; 73/731

[58] Field of Search .................. 92/89, 90, 91, 92, 48, 92/50, 140; 73/731, 730

[56] References Cited

U.S. PATENT DOCUMENTS

| | | | |
|---|---|---|---|
| 2,404,801 | 7/1946 | Hollerith | 92/92 |
| 2,644,336 | 7/1953 | Bowditch | 92/91 |
| 2,712,240 | 7/1955 | Booth | 92/91 |
| 3,343,864 | 9/1967 | Baer | 73/731 |
| 3,601,442 | 8/1971 | Orndorff | 92/91 |
| 3,613,455 | 10/1971 | Hightower et al. | 92/92 |
| 3,924,519 | 12/1975 | England | 73/731 |
| 4,108,050 | 8/1978 | Paynter | 92/92 |
| 4,615,260 | 10/1986 | Takagi et al. | |
| 4,751,868 | 6/1988 | Paynter | 92/48 |
| 4,794,912 | 1/1989 | Lia | 92/92 |
| 4,841,845 | 6/1989 | Beullens | 92/90 |
| 4,976,191 | 12/1990 | Suzumori et al. | 92/89 |

FOREIGN PATENT DOCUMENTS

| | | | |
|---|---|---|---|
| 969302 | 6/1975 | Canada | 92/90 |

OTHER PUBLICATIONS

*IBM Technical Disclosure Bulletin*, vol. 8, No. 6, Nov. 1965.

*Primary Examiner*—Edward K. Look
*Assistant Examiner*—Thomas Denion
*Attorney, Agent, or Firm*—Sughrue, Mion, Zinn, Macpeak & Seas

[57] ABSTRACT

A bendable actuator includes a tubular body made of an elastic material, a reinforcing braided structure surrounding the tubular body, and closure members closing both open ends of the tubular body and the reinforcing braided structure, respectively. At least one closure member is formed with a connecting aperture communicating with an internal space of the tubular body. A restraining device is provided at least partially between the closure members for partially restraining extension of the actuator in the axial direction. When the tubular body is supplied with a pressurized fluid, the actuator is extended in the axial direction while being curved at the same time.

12 Claims, 6 Drawing Sheets

BENDABLE ACTUATOR

BACKGROUND OF THE INVENTION

This invention relates to a bendable actuator of an air-bag type, which is extensible in curving when a pressurized fluid is supplied into the actuator.

Electric motors, hydraulic cylinders, and the like have been known as actuators for transferring electric energy or energy in pressurized fluids into mechanical energy.

However, an electric motor usually requires a speed reduction mechanism including gear trains to thereby increasing the weight and space to be occupied by the motor. Moreover, due to sparks unavoidably occurring in operation, the use of the motor in an explosive atmosphere is extremely limited.

On the other hand, in the case of a hydraulic cylinder, in addition to the abovementioned problems, it is difficult to completely prevent leakage of operating oils so that environmental contamination by the leaked oils could not be avoided. Moreover, the temperature and purity of the operating oils must be finely managed. As a result, in order to obtain a high power actuator of the hydraulic cylinder type, it will become inevitably large sized.

Moreover, output shafts of the electric motors and hydraulic cylinders are only allowed to perform rotary or linear movements.

SUMMARY OF THE INVENTION

It is an object of the invention to provide a bendable actuator which is small and light weight irrespective of its high output power and is able to perform curved movements.

In order to accomplish this object, in a bendable actuator including a tubular body made of an elastic material, a reinforcing braided structure surrounding the tubular body, and closure members closing both open ends of the tubular body and the reinforcing braided structure, respectively, at least one of the closure members being formed with a connecting aperture communicating with an internal space of the tubular body, said actuator being extended in its axial direction when a pressurized fluid is supplied into the tubular body, according to the invention restraining means for partially restraining extension of the actuator in the axial direction is provided at least partially between the closure members.

When a pressurized fluid is supplied through the connecting aperture into an internal space of the tubular body, the actuator tends to extend with decreasing braided angles of the reinforcing braided structure. However, the restraining means at least partially provided between the closure members partially prevents total axial movements of the actuator so that the actuator is curved with the restraining means located on an inner side of the curved actuator.

The invention will be more fully understood by referring to the following detailed specification and claims taken in connection with the appended drawings.

EXPLANATION OF THE PREFERRED EMBODIMENTS

Figure 1A:
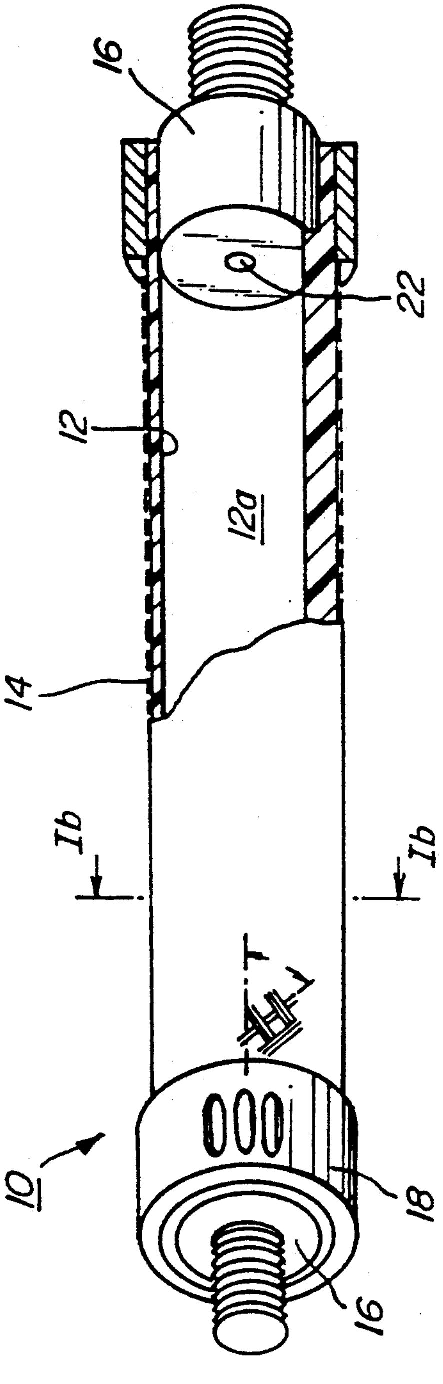
FIG. 1*a* is a partial sectional view illustrating an actuator according to the invention.

FIG. 1*a* illustrates in partial section an actuator 10 according to the invention. A tubular body 12 is surrounded by a reinforcing braided structure 14, and both open ends of these members are closed by closure members 16, respectively. In order to securely prevent the tubular body 12 and the reinforcing braided structure 14 from being dislodged, these members are externally pressed by clamp sleeves 18.

The tubular body 12 is preferably made of a rubber or rubber-like elastomer or other materials equivalent thereto, which are impermeable to pressurized fluids such as pressurized air, liquid and the like and are superior in flexibility permitting of the tubular body sufficiently expanding when the pressurized fluid is supplied thereinto.

Figure 1B:
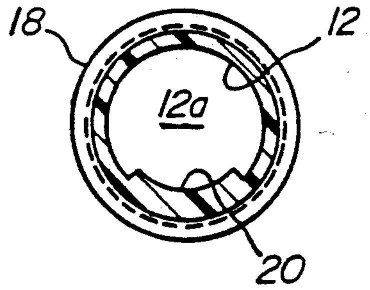
FIGS. 1*b* and 1*c* are a sectional view taken along a line Ib—Ib in FIG. 1*a* and an explanatory view illustrating the curved extended actuator shown in FIG. 1*a*, respectively.

The tubular body 12 of this embodiment has a restraining member 20 extending in its axial direction and located on a part of an inner circumferential surface as clearly shown in FIG. 1*b*. The restraining member 20 in this embodiment is a thicker portion formed by a strip made of a material equivalent to the rubber or rubber-like elastomer constituting the tubular body 12 and integrally joined by vulcanizing or with an adhesive onto the inner circumferential surface of the tubular body 12. However, instead of using such a strip, the tubular body 12 may be formed of a rubber or a rubber-like elastomer as a starting material having a partial thicker portion along the axial direction. A strip may be arranged partially along the axial direction without extending over its entire length. Moreover, the restraining portion 20 made of the material above described may be fixed with its both ends to the closure members, respectively, without being joined to the inner circumferential surface of the tubular body.

The reinforcing braided structure 14 is made of cords which are organic or inorganic high tensile fibers, for example, polyester fibers or aromatic polyamid fibers (trade name, KEVLAR) or twisted or nontwisted filament bundles such as very fine metal wires. The initial braided angle $\theta 0$ of the braided structure is greater than the angle of repose (54°, 44′) preferably within a range between 70° and 85° and decreases the angle of repose (54° 44′) upon the maximum extension or elongation of the tubular body 12 in the axial direction when pressurized fluid is applied to the tubular body.

At least one of the closure members 16 closing both the open ends of the tubular body 12 and the reinforcing braided structure 14 is formed with a connecting aperture 22 for supplying and exhausting the pressurized fluid into and out of an internal space 12*a* of the tubular body 12.

These closure members 16 may be made of a metal, for example, aluminum, stainless steel, steel or the like. However, it may be preferably made of so-called engineering plastics in order to make the actuator 10 more light weight.

In the embodiment, moreover, each of the closure members 16 is provided on an outward end face with a projection extending in the axial direction of the tubular body 12. The projection is formed with a male screw which is threadedly engaged with a female screw formed in a suitable fixing member or driven member, thereby enabling the actuator to be integrally connected to such a member with ease. However, the connection can be modified in various manners. For example, the projection is formed with a pin-shaped aperture, and a pivot pin secured to a fixing member or a driven member is inserted into the pin-shaped aperture for this purpose.

The operation of the actuator according to the invention will be explained hereinafter.

When a pressurized fluid is supplied through the connecting aperture 22 into the inner space 12*a* of the tubular body 12, the reinforcing braided structure 14 is extended in its axial direction as if pantographs made of the cords braided in a number of rhombuses were deformed. Such extending movements of the braided cords of the tubular body are referred to herein "pantograph movements".

However, since the thicker portion as the restraining member 20 is formed on the inner circumferential surface of the tubular body 12, there is a difference in extended degree on the circumference of the tubular body.

Figure 1C:
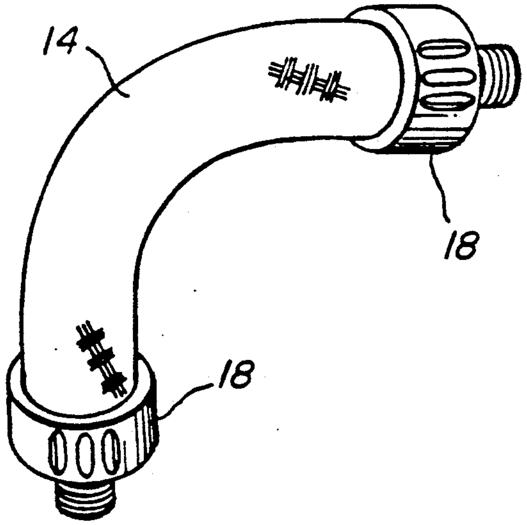

In other words, the extension of the tubular body on the side of the restraining member 20 is restrained more than on the side of the tubular body having no the restraining member 20. Therefore, the actuator 10 is extended curving in a manner that the restraining member 20 is brought onto an inner side of the curved actuator 10 as shown in FIG. 1*c*. Although the restraining member 20 is provided on the inner circumferential surface of the tubular body 12, the member 20 may be provided on an outer side of the tubular body 12.

Moreover, braided portions of the reinforcing braided structure 14 corresponding to the position of the restraining member 20 extending in the axial direction may be fixed relative to each other with a suitable adhesive to restrain their pantograph movements in conjunction with the restraining action of the restraining member 20, thereby greatly increasing the curved extent of the actuator 10. The adhesively fixed braided portions alone may of course be used for the purpose of the restraining member 20.

Figure 2A:
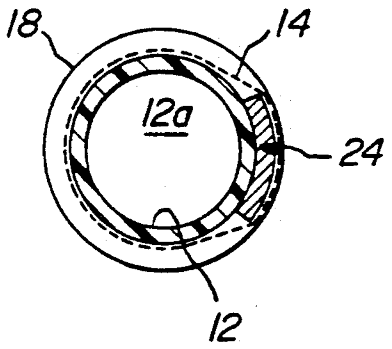
FIGS. 2*a* and 2*b* are a sectional view of an actuator of another embodiment of the invention and an explanatory view illustrating the curved extended actuator shown in FIG. 2*a*, respectively.

FIG. 2*a* illustrates another embodiment of the actuator according to the invention. In the drawings including FIG. 2*a* and the succeeding drawings, like components having the similar functions to those in the first embodiment are designated by the same reference numerals as those in FIG. 1*a* for the sake of simplicity.

As shown in a sectional view of FIG. 2*a*, an actuator 30 in this embodiment includes a restraining member 24 between a tubular body 12 and a reinforcing braided structure 14 and between closure members 16. The restraining member 24 is made of a material such as a woven cloth, felt or the like, which scarcely changes its braided angles and which is quite different from the material of the reinforcing braided structure.

Figure 2B:
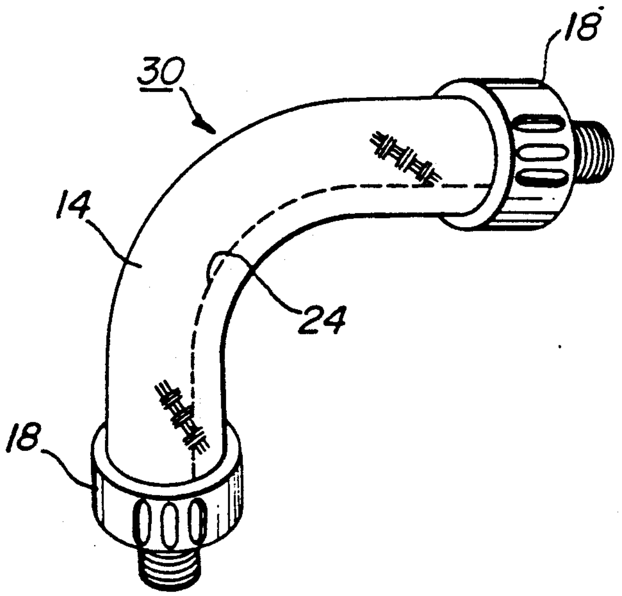

When a pressurized fluid is supplied into a space 12*a* in the tubular body 12 of the actuator 30, the reinforcing braided structure 14 is extended with decreasing initial braided angles owing to its pantograph movement. In this case, however, the restraining member 24 arranged between the tubular body 12 and the reinforcing braided structure 14 partially prevents a uniform elongation of the actuator 30 on a circumference of the tubular body 12. Therefore, the actuator is curved as shown in FIG. 2*b*.

In this embodiment, also the restraining member 24 made of a woven cloth or felt may be partially fixed onto an outer circumference of the tubular body 12 along its axial direction with an adhesive. The restraining member 24 may be fixed onto the reinforcing braided structure 12 along its axial direction over its length or partially. As an alternative, the restraining member 24 may be integrally fixed to the tubular body and the reinforcing braided structure. Of course, the restraining member 24 may be formed on an outer circumference of the reinforcing braided structure 14 along its axial direction.

Figure 3:
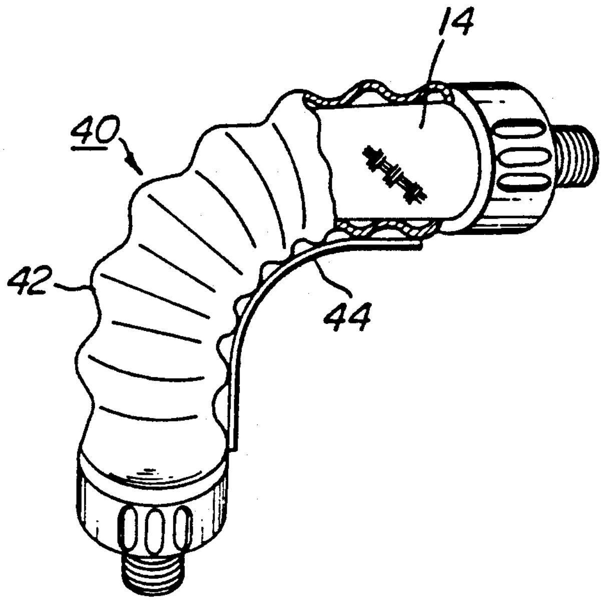
FIGS. 3 and 4 are views illustrating other embodiments of the invention, respectively.

FIG. 3 illustrates a further embodiment of the invention. The actuator 40 shown in FIG. 3 comprises a bellows structure 42 corrugated in longitudinal sections arranged therearound and surrounding a reinforcing braided structure 14 to permit its elongation and contraction in axial directions. Therefore, the bellows structure 42 has radially inwardly and radially outwardly projecting portions alternately. A wire 44 extends between closure members 16 and is fixed to peaks of radially outwardly projecting portions of the bellows structure 42 on one side thereof.

When a pressurized fluid is supplied into an internal space 12*a* of the tubular body of the actuator 40, the wire 44 partially prevents an extension of the reinforcing braided structure 14 decreasing braided angles, so that the actuator 40 extends while being curved as shown in FIG. 3. The wire 44 may be fixed to peaks of the radially inwardly projecting portions of the bellows structure 42. Moreover, the wire 44 is divided into plural wire parts partially extending along the peaks of the bellows structure 42.

In this embodiment, by covering the reinforcing braided structure 14 and the tubular body 12 with a bellows structure 42 made of a material superior in weather resistance and oil resistance, the actuator can be used directly exposed to severe environmental conditions.

Figure 4:
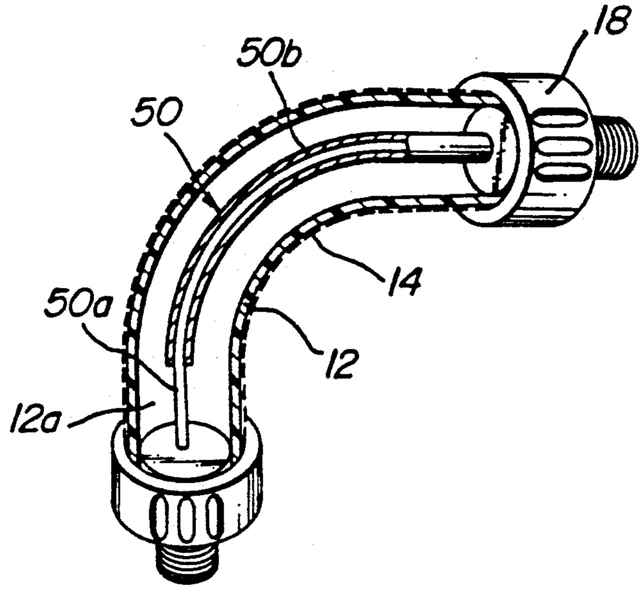

In a further embodiment shown in FIG. 4, curved guide means 50 is provided between closure members 16 closing both open ends of a tubular body 12 and a reinforcing braided structure 14. The curved guide means 50 comprises a guide member 50*a* whose one end is fixed to one of the closure members 16 and a guide member 50*b* formed along its axis with a guide aperture into which the other end of the guide member 50*a* is inserted. At least one of the guide members 50*a* and 50*b* is a curved rigid member.

With this arrangement, when a pressurized fluid is supplied into an internal space 12*a* of the tubular body 12, the actuator extends along the curved direction of the guide means 50 with the pantograph movement of the reinforcing braided structure 14. As the curved guide means is high in rigidity in lateral directions, the actuator shown in FIG. 4 is improved in rigidity.

Figure 5A:
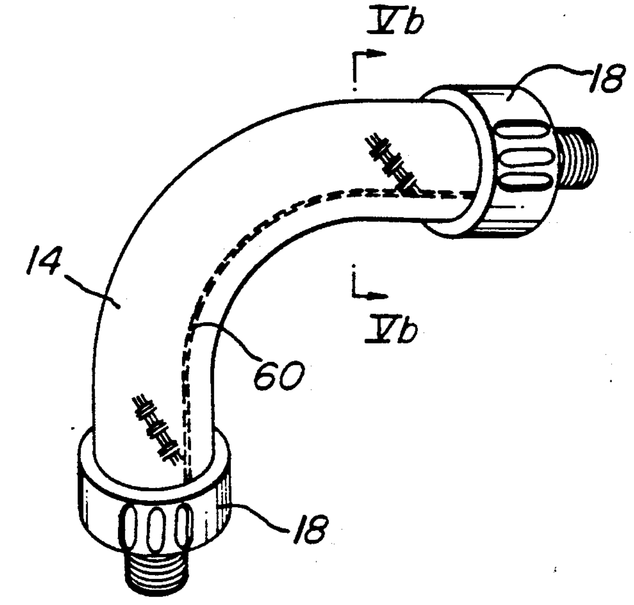
FIGS. 5*a* and 5*b* are a view illustrating a curved extended actuator of a further embodiment of the invention and an explanatory view illustrating the actuator in section taken along the line Vb—Vb in FIG. 5*a*. respectively.
Figure 5B:
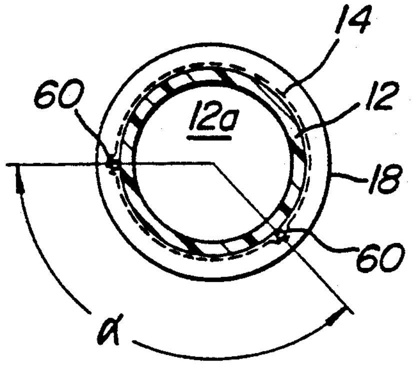

FIG. 5*a* illustrates a further embodiment of the actuator according to the invention. Two wires 60 are provided extending between closure members and between a tubular body 12 and a reinforcing braided structure 14 and spaced circumferentially of the tubular body 12 as shown in FIG. 5*b*. In this case, a central angle $\alpha$ of an arc between the wires 60 on the tubular body 12 is preferably less than 180°. With this arrangement, the actuator can be bent sharply with a smaller radius of curvature and in addition can be bent with high accuracy because of a higher restraining force against an elongation of the actuator.

Figure 5C:
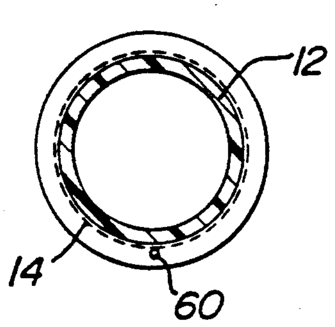
FIG. 5*c* is a sectional view illustrating a further embodiment of the actuator according to the invention.

The wires 60 constituting the restraining member are arranged between the tubular body 12 and the reinforcing braided structure 14. However, the wires 60 may be arranged outwardly of the reinforcing braided structure 14. As shown in FIG. 5*c*, a single wire may be arranged instead of the two wires. Moreover, numbers and/or diameters of wires to be used may be changed to modify restraining forces of the wires.

Figure 6:
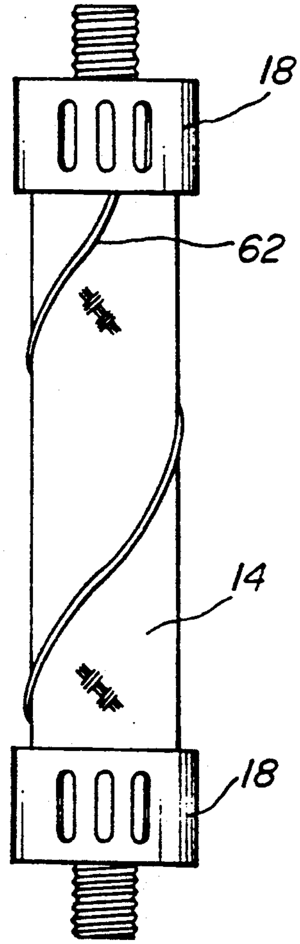
FIG. 6 is an explanatory view illustrating a modification of the actuator according to the invention.

In a further embodiment of the actuator according to the invention shown in FIG. 6, a wire or strip 62 as a restraining member is spirally wound around an outer circumference of a reinforcing braided structure 14 and both ends of the wire or strip 62 are fixed to clamp sleeves 18, respectively. When a pressurized fluid is supplied into the tubular body 12, the actuator is extended rotating about an axis of the tubular body with its elongation, while decreasing angles of the wire 62 made with an axis of the tubular body.

While the invention has been particularly shown and described with reference to preferred embodiments thereof, it will be understood by those skilled in the art that the foregoing and other changes in form and details can be made therein without departing from the spirit and scope of the invention. For example, one end of a restraining member is fixed to a closure member or clamp sleeve and the other end is fixed to a connecting fixture rotatably arranged around the other closure member or clamp sleeve. In this case, the connecting fixture is rotated to change positions of the restraining member, whereby curved portions of an actuator can be modified.

As can be seen from the above explanation, the actuator according to the invention can transfer the energy in a pressurized fluid into the mechanical movements with high efficiency because of an air-bag type actuator. In addition, the actuator according to the invention is small and light weight in comparison with those of the prior art. Moreover, the actuator disclosed herein enables its movement's directions to be curved. Therefore, the actuator according to the invention is applicable to various uses in a wide range.

What is claimed is:

1. A bendable actuator including a tubular body made of an elastic material and having a pair of open ends, a reinforcing braided structure surrounding the tubular body and having an initial braided angle which is greater than an angle of repose (54°,44'), and closure members closing both open ends of the tubular body and the reinforcing braided structure, respectively, at least one of the closure members being formed with a connecting aperture communicating with an internal space of the tubular body, said actuator being extended in its axial direction when a pressurized fluid is supplied into the tubular body, wherein restraining means for partially restraining extension of the actuator in the axial direction is provided at least partially between the closure members such that said actuator undergoes controlled axial extension and simultaneous bending when a pressurized fluid is applied to the internal space of the tubular body.

2. A bendable actuator as set forth in claim 1, wherein said restraining means comprises a thicker portion of the tubular body extending in the axial direction.

3. A bendable actuator as set forth in claim 1, wherein said restraining means comprises a restraining member made of a braided material which scarcely changes its braided angles and arranged between the tubular body and the reinforcing braided structure and between the closure members.

4. A bendable actuator as set forth in claim 3, wherein said material is one selected from a woven cloth and a felt.

5. A bendable actuator as set forth in claim 1, wherein said restraining means comprises at least one wire between the closure members.

6. A bendable actuator as set forth in claim 5, wherein said wire is arranged between the tubular body and the reinforcing braided structure.

7. A bendable actuator as set forth in claim 5, wherein said wire is arranged outwardly of the reinforcing braided structure.

8. A bendable actuator as set forth in claim 5, wherein two wires are so arranged that a central angle of an arc between the two wires on the tubular body is less than 180°.

9. A bendable actuator as set forth in claim 1, wherein said restraining means comprises an elongated member spirally wound around an outer circumference of the reinforcing braided structure and whose both ends are fixed to ends of the actuator, respectively.

10. A bendable actuator as set forth in claim 1, wherein the initial braided angle of the reinforcing braided structure is within a range between 70° and 85°.

11. A bendable actuator including a tubular body made of an elastic material and having a pair of open ends, a reinforcing braided structure surrounding the tubular body, and closure members closing both open ends of the tubular body and the reinforcing braided structure, respectively, at least one of the closure members being formed with a connecting aperture communicating with an internal space of the tubular body, said actuator being extended in its axial direction when a pressurized fluid is supplied into the tubular body, wherein restraining means for partially restraining extension of the actuator in the axial direction is provided at least partially between the closure members, wherein said restraining means comprises a bellows structure corrugated in longitudinal sections arranged therearound and surrounding the reinforcing braided structure to permit its extension and contraction in axial directions, and at least one wire fixed to at least some peaks of radially projecting portions of the bellows structure.

12. A bendable actuator including a tubular body made of an elastic material and having a pair of open ends, a reinforcing braided structure surrounding the tubular body, and closure members closing both open ends of the tubular body and the reinforcing structure, respectively, at least one of the closure members being formed with a connecting aperture communicating with an internal space of the tubular body, said actuator being extended in its axial direction when a pressurized fluid is supplied into the tubular body, wherein restraining means for partially restraining extension of the actuator in the axial direction is provided at least partially between the closure members, wherein said restraining means comprises a first guide member whose one end is fixed to one of the closure members and a second guide member formed along its axis with a guide aperture into which the other end of the first guide member is inserted, at least one of the first and second guide members being a curved rigid member.

* * * * *